Nov. 2, 1971    A. SCHOLBERG    3,616,689
HIGH TEMPERATURE MEASUREMENT METHOD AND APPARATUS
Filed Oct. 24, 1969    3 Sheets-Sheet 1

André V.A. Scholberg
INVENTOR

BY William J Beard
ATTORNEY

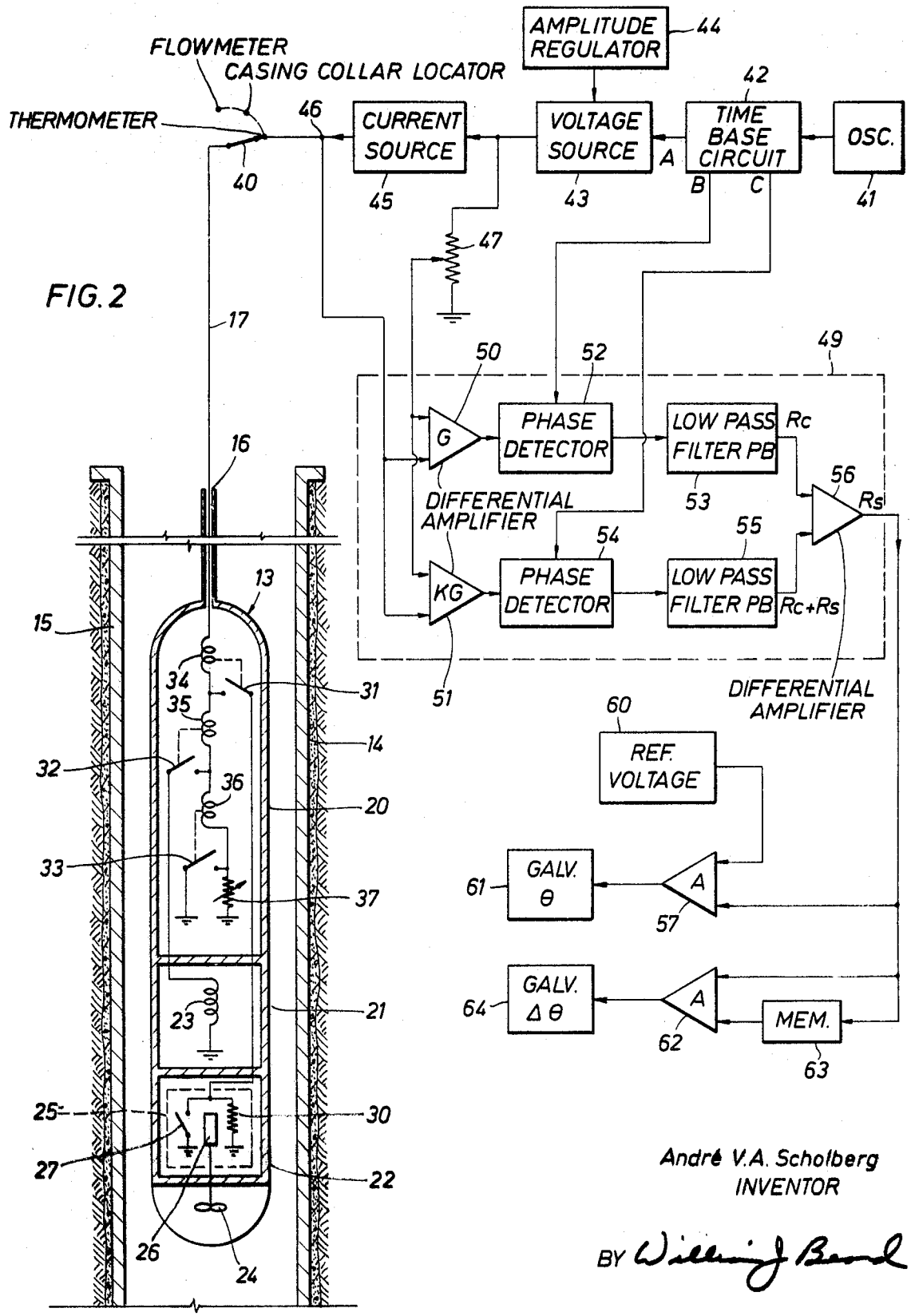

Nov. 2, 1971  A. SCHOLBERG  3,616,689
HIGH TEMPERATURE MEASUREMENT METHOD AND APPARATUS
Filed Oct. 24, 1969  3 Sheets-Sheet 5

André V.A. Scholberg
INVENTOR

BY William J Beard
ATTORNEY

United States Patent Office 3,616,689
Patented Nov. 2, 1971

1

3,616,689
HIGH TEMPERATURE MEASUREMENT
METHOD AND APPARATUS
André Scholberg, Boulogne-Billancourt, France, assignor to Schlumberger Technology Corporation, New York, N.Y.
Filed Oct. 24, 1969, Ser. No. 869,293
Claims priority, application France, Dec. 17, 1968, 178,578
Int. Cl. E21b 47/06
U.S. Cl. 73—154
17 Claims

ABSTRACT OF THE DISCLOSURE

An illustrative embodiment of the invention includes methods and apparatus for measuring temperature and other parameters of interest in a well bore by use of a monocable logging tool. A temperature sensitive element connected to the end of a monocable is supplied with a constant current. The voltage produced at the surface is thereby a function of the resistance of the element. The voltage produced with the temperature sensitive element shorted out and that produced with a known value calibration resistor may then be combined in a manner to eliminate errors due to the resistance of the monocable conductor or any stray monocable insulation leakage resistance.

BACKGROUND OF THE INVENTION

The invention concerns methods and systems for study of well boreholes and, more particularly, to measure a temperature sensitive resistive component in a well under high temperature and pressure conditions.

Among the measurements conducted in a well borehole, the sensitive component that can be lowered into the well by means of a cable, frequently comes in the form of a variable resistor. Such is the case, in particular, of thermometer measurements in which the sensitive component is a resistor that varies linearly as a function of the temperature. This sensitive component can also be a potentiometer as in the case of pressure, diameter of the hole, or other measurements.

Under normal pressure and temperature conditions, the measurement of such a variable resistance raises relatively few problems. By supplying this component with a constant current, the voltage at the terminals delivers a signal representative of the resistance. If a multi-conductor cable is available, it is possible to use a bridge system in the downhole unit. If a single conductor cable is used, allowances must be made for the fact that the resistance and insulation of the cable conductor can vary during the measurement. Generally, then, the signal is transmitted after the measurement by the modulation of a carrier signal thereby requiring electronic circuits in the downhole unit.

In certain wells, for example steam injection wells, the fluid is under pressure and is at a temperature which frequently exceeds 300° C. In order to maintain the pressure, it is necessary to use a packing or sealing system at the well head to enable introduction of the cable without releasing pressure. With such a system and as a result of the increasing force applied to the cable, it is necessary, in order to be capable of lowering the metering system under good conditions, to use a small diameter cable,

2 that is to say a monocable having only a single electrical conductor. Furthermore, the resistance and insulation of the cable subjected to such high temperatures, vary in proportions such that the measurement of a sensitive resistive component in which resistance variations are sometimes less than those of the cable, is impossible in a direct manner. Furthermore, downhole electronic components cannot withstand such temperatures and it is then necessary to heat insulate them by means of a Dewar bottle for example. Such insulation is not very reliable, it complicates the downhole equipment, and limits the duration of measurements.

Accordingly, an object of the invention is to provide a simple method enabling measurement of a sensitive resistive component in a well under pressure at high temperature without having to limit the duration of the measurement.

A further object of the invention is to provide a system for the accurate measurement of a sensitive resistive component in which the downhole equipment includes no electronic components.

In accordance with the objects of the invention, a method is provided to measure, in a well, a sensitive resistive component connected to the end of a single conductor shielded cable. This is accomplished by delivering a constant current into the cable to obtain, at the surface, a voltage as a function of the resistance of the sensitive component. At least two multiplexed measurements are made, the first measurement being a function of the resistance in the single conductor and the resistance of the sensitive component, the second being a function of the resistance in the single conductor only. The two multiplexed measurements are combined in such a manner as to eliminate the resistance in the single conductor.

Additionally, a third multiplexed measurement may be made which is a function of the resistance in the single conductor and a calibration resistor. The three measurements may then be combined in such a manner as to eliminate the resistance in the single conductor and at least, partly, the errors due to faulty single conductor insulation.

The objects and advantages of the invention will be further appreciated from the description to follow, which is given as a non-limitative example with reference to the attached drawings on which:

BRIEF DESCRIPTION OF THE DRAWINGS

FIG. 2 is a schematic view of the invention with the electrical circuits being represented in a simplified manner;

DESCRIPTION OF THE PREFERRED EMBODIMENT

Figure 1:
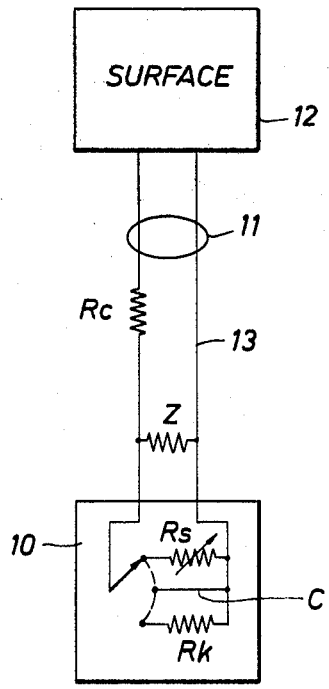
FIG. 1 is a schematic diagram representing the theory of the measuring method in accordance with the invention.

FIG. 1 diagrammatically shows a downhole unit 10 connected by a cable 11 to surface circuits 12. Cable 11 consists of a single conductor having a resistance $R_c$ and a shield 13 serving as a return conductor. A resistor Z represents the insulation losses at cable head. In bottom unit 10, a temperature sensitive component is schematically illustrated as a resistor $R_s$ which varies as a function of a parameter to be measured, in this case temperature. The conductor of cable 11 can be switched to this resistor $R_s$, to a short circuit C or to a calibration resistor $R_k$. To obtain the value of $R_s$, a current I is delivered from surface circuits 12 into cable 11. Resistor $R_s$, short circuit C and resistor $R_k$ are successively switched into the circuit. The potential at surface is respectively:

$$V_1 = I\left(R_c + \frac{ZR_s}{Z+R_s}\right)$$

for the temperature sensitive element $R_s$ $$V_2 = IR_c$$

for the short circuit $$V_3 = I\left(R_c + \frac{ZR_k}{Z+R_k}\right)$$

for the calibration element $R_k$

Forming the differences $(V_1-V_2)$ and $(V_3-V_2)$, the following is obtained:

$$V_1 - V_2 = I\frac{ZR_s}{Z+R_s}$$

$$V_3 - V_2 = I\frac{ZR_k}{Z+R_k}$$

If Z is very high relative to $R_s$, that is to say, if the insulation at cable head is good, $V_1-V_2$ is very close to $IR_s$ and the difference $V_1-V_2$ will give a sufficiently accurate measurement of $R_s$ that is independent of the resistance of the cable $R_c$. On the other hand, if the insulation in the cable is faulty, it is necessary to use $V_3-V_2$ to correct $V_1-V_2$.

An approximate correction can be obtained by taking the ratio $$\frac{(V_1-V_2)}{(V_3-V_2)} = \frac{R_s}{R_k} \cdot \frac{(Z+R_k)}{(Z+R_s)} \simeq \frac{R_s}{R_k}\left(1 + \frac{R_k-R_s}{Z}\right)$$

By making $R_k$ for example, the average value of $R_s$, and by assuming that $R_s$ varies approximately from the initial value to double that value, which is the case, for example, in heat sensitive resistors used when measuring temperatures in wells, the error in $R_s$ will be minimized by this approximation.

With reference to FIG. 2, a system for application of the method described hereabove includes a probe 13 located in a well 14 with or without casing 15. This probe 13 is suspended from a shielded cable 16 in such a manner as to be capable of moving along well 14 by means of a winch (not shown). Cable 16 contains a conductor 17 which electrically connects the probe to the surface circuits. The probe 13 consists of a thermometer section 20, a section 21 for detection of casing joints and the flow metering section 22. The two lower sections are of conventional type and can be replaced by any other probe not requiring electronic components. In the joint detection section 21, is installed a coil 23 that is sensitive to the magnetic permeability of the casing. The flow metering section 22 includes a propeller 24 and a detection circuit 25. The propeller 24 is fixedly attached to a magnet 26 which, when rotating, closes a "reed" relay 27 or the like. The relay 27 short circuits a resistor 30 in such a manner that the variations in the resistance of the detection circuit 25 have a frequency proportional to the speed of the propeller 24.

The thermometer section 20 includes three "reed" relays 31, 32 and 33 or the like, in which the respective control coils 34, 35 and 36 are connected in series to conductor 17 of cable 16. A temperature sensitive resistive component 37 is connected between ground and the lower end of lower coil 36. This temperature sensitive component 37 could be, for example, a platinum wire in which the resistance varies linearly as a function of the temperature. This resistor can be short circuited by closing relay 33. Relay 31 connects the common point of coils 34 and 35 to detection circuit 25, whereas relay 32 connects the common point of coils 35 and 36 to joint detection coil 23. These relays are chosen to operate at currents with different levels and make it possible to separately connect the various probes, as will be explained later.

Conductor 17 is connected to the surface circuits by means of a selector switch 40 with three positions enabling connection of three different circuits in such a manner as to obtain thermometer, flow meter and joint detection measurements without raising the probe 13 to the surface. In FIG. 2, only the thermometer circuit is shown, the two others being of conventional type.

On the surface, an oscillator 41 is connected to the input of a time base 42 formed in a usual manner by a series of binary dividers and logic circuits in such a manner as to deliver signals with an appropriate pulse at the three outputs A, B and C. Output A is connected to a voltage source 43 having an amplitude control 44 and is also connected to a current source 45, and to the terminal of a potentiometer 47 with the other terminal grounded. The current delivered by current source 45 is applied to a point 46 connected to the cable conductor 17 when selector switch 40 is in the thermometry position as shown on FIG. 2.

Point 46 is permanently linked to one input of the two differential amplifiers 50 and 51 having different gains G and KG respectively. The other input of amplifiers 50 and 51 is connected to the wiper of a potentiometer 47. The output of amplifier 50 is connected to a low pass filter 53 by means of a phase detector 52 for which the time reference is delivered by the output B of time base 42.

Further, the output signal from amplifier 51 is applied to a phase detector 54 to which the time reference is delivered by the output C of time base 42, then to a low pass filter 55. The outputs of the two filters 53 and 55 are applied to a differential amplifier 56. The output of amplifier 56 is connected to the input of another differential amplifier 57. A reference voltage 60 is applied to the other input of amplifier 57 and the output of amplifier 57 is connected to a galvanometer 61. The output signal from amplifier 56 is also applied to yet another differential amplifier 62 first directly and second through a memory circuit 63, which may be a delay line or the like, in such a manner as to deliver a differential output signal to a second galvanometer 64.

In operation, relays 33, 32 and 31, which are normally open close successively for currents of increasing levels $i_1$, $i_2$ and $i_3$ passing through control coils 36, 35 and 34. When selector switch 40 is in the thermometer position, the current delivered into conductor 17 is always less than $i_2$ in such a manner that relays 31 and 32 are open permanently thereby disconnecting the flow metering and joint detection circuits.

Figure 3:
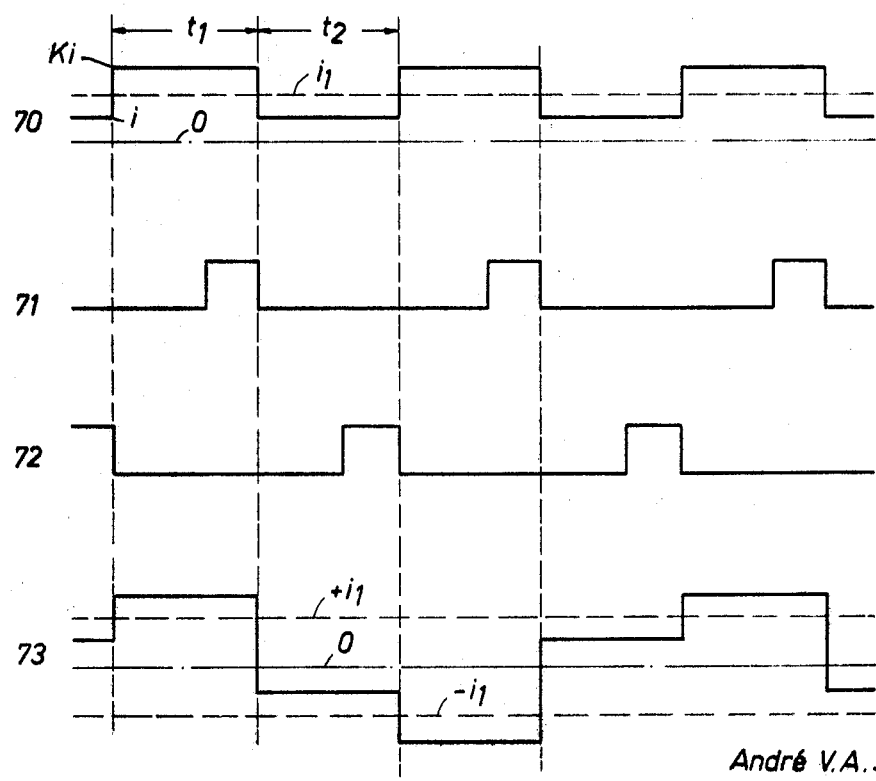
FIG. 3 is a timing diagram of the signals at various points of the circuits on FIG. 2.

Referring now to FIG. 3, the current delivered by current source 45 is a low frequency square wave current (a few Hz.) illustrated by curve 70 which takes a value $K_i$ that is higher than $i_1$ for a time period $t_1$ and a value $i$ that is less than $i_1$ for a time period $t_2$.

This current, when passing through coil 36, closes relay 33 during period $t_1$ in such a manner that current $i$ passes through temperature sensitive resistor 37 for period $t_2$. The current $K_1$ then passes directly from coil 36 to ground during period $t_1$. The voltage appearing at point 46 is, therefore, a function of the resistance in conductor 17 and coils 34, 35 and 36 during period $t_1$ and the resistances in conductor 17, of coils 34, 35 and 36 and of sensitive component 37 during period $t_2$. This voltage is applied to amplifiers 50 and 51 in which the gains are in the same ratio K as the currents applied by current source 45. The phase detector 52 operates during time periods $t_1$, the reference signal at output B of time base 42 having the shape 71 shown in FIG. 3. Detector 54, in which the time reference originating from output C has shape 72 (FIG. 3), operates during time intervals $t_2$. It will be noticed that detection only takes place in the final part of time periods $t_1$ or $t_2$ so as to avoid transient signals which appear at the beginning of each period on opening and closing of relay 33.

The signals at the outputs of filters 53 and 55 are direct current voltages respectively proportional to the resistance $R_c$ in conductor 17 and the sum $R_c+R_s$ of resistances in this conductor and the sensitive component. Amplifier 56 gives a voltage proportional to $R_s$ which can be recorded by means of galvanometer 61. The reference voltage 60 makes it possible to select the desired temperature scale. A differential temperature curve can be obtained by means of galvanometer 64 which receives, from amplifier 62, a signal that is a function of the temperature increment over the time period delay provided by the memory unit 63. Potentiometer 47 serves to shunt a large portion of the signal given by the cable itself to avoid saturation of amplifiers 50 and 51.

To avoid polarization of relay 33, rather than using a current such as shown at curve 70, preference is given to a current which changes polarity at each cycle as shown by curve 73 in FIG. 3.

For detection of casing joints, selector switch 40 is placed in the second position and a current of more than $i_2$ but less than $i_3$ is delivered into conductor 17. Relays 32 and 33 are then closed, relay 31 remains open. The signal delivered by coil 23 is, therefore, the only signal to reach the surface. For flow measurement, selector 40 is placed in the third position and a current of more than $i_3$ is delivered into conductor 17 closing relay 31. Resistor 30 in the detection circuit 25 is selected to be of sufficiently low value for the current which passes through coil 35 to be insufficient to maintain relay 32 closed. Detection circuit 25 is then the only circuit to deliver a signal through conductor 17.

Figure 4:
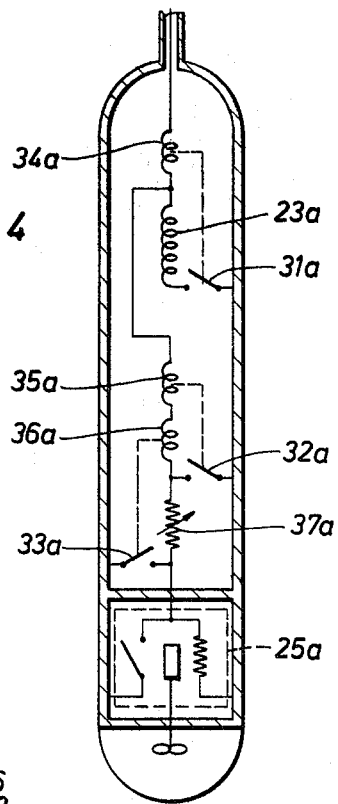
FIG. 4 is the diagram of another embodiment of the probe of FIG. 1.

The layout of relays and sensors in probe 13 can, of course, consist of numerous other alternatives. In FIG. 4, an illustration has been given of another layout in which joint detection coil 23a, temperature sensitive component 37a, detection circuit 25a and the three relays 31a, 32a, 33a, as well as their control coils 34a, 35a and 36a may be recognized. For a current less than $i_1$, the three relays are open, the probe is in flow metering position and the signal from detector 25a, although superimposed on a signal originating from the sensitive component 37a, can easily be detected as a result of the very slow variations in the resistance 37a. Temperature measurement takes place by a current that varies from a value $i$ included between $i_1$ and $i_2$ to a value $iK$ included between $i_2$ and $i_3$. Relay 33a is constantly closed, thereby short circuiting detector 25a, whereas relay 32a opens and closes during time periods $t_1$ and $t_2$ so as to generate two multiplexed signals, one proportional to the resistances in the single conductor and sensitive component 37a.

Detection of casing joints is obtained by delivering a current that is higher than $i_3$ which closes three relays 31a, 32a and 33a, that short circuits the thermometer and flow metering sensor and connects coils 23a. This layout is therefore equivalent to the probe in FIG. 2. Preference, however, is given to the probe in FIG. 2 since the currents used for temperature measurements are less than those used in the probe in FIG. 4.

Figure 5:
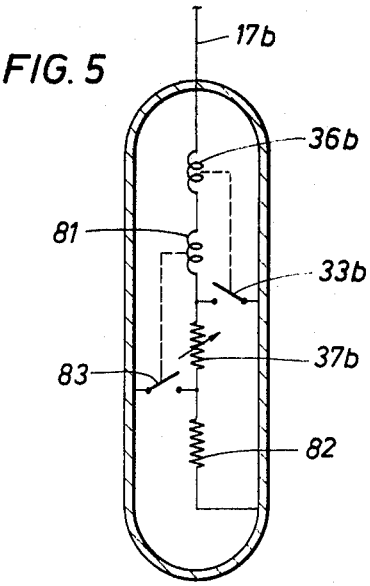
FIG. 5 is the diagram of a third embodiment of the probe on FIG. 1.

It is possible to increase the accuracy of the measurement of the temperature sensitive component, to reduce the errors originating from faulty cable insulation in accordance with the method previously described with reference to FIG. 1. To effect this, a calibration resistor and an additional relay are added. This layout is shown in FIG. 5, with the joint detection and flow metering sensors not shown so as to simplify the description. For example, it can be considered that these sensors are disconnected by a set of relays as in the apparatus of FIG. 2.

With reference to FIG. 5, two control coils of relays 36b and 81, a temperature sensitive component 37b and a calibration resistor 82, are connected in series between conductor 17b and the ground. A relay 33b controlled by coil 36b, connects the ground to the junction point between coil 81 and sensitive component 37b. A relay 83 controlled by coil 81 connected to the ground of the junction joint between sensitive component 37b and calibration resistor 82. Relay 33b closes for a current $i_1$ as previously described, relay 83 closes for a current $i_0$ less that $i_1$.

Figure 6:
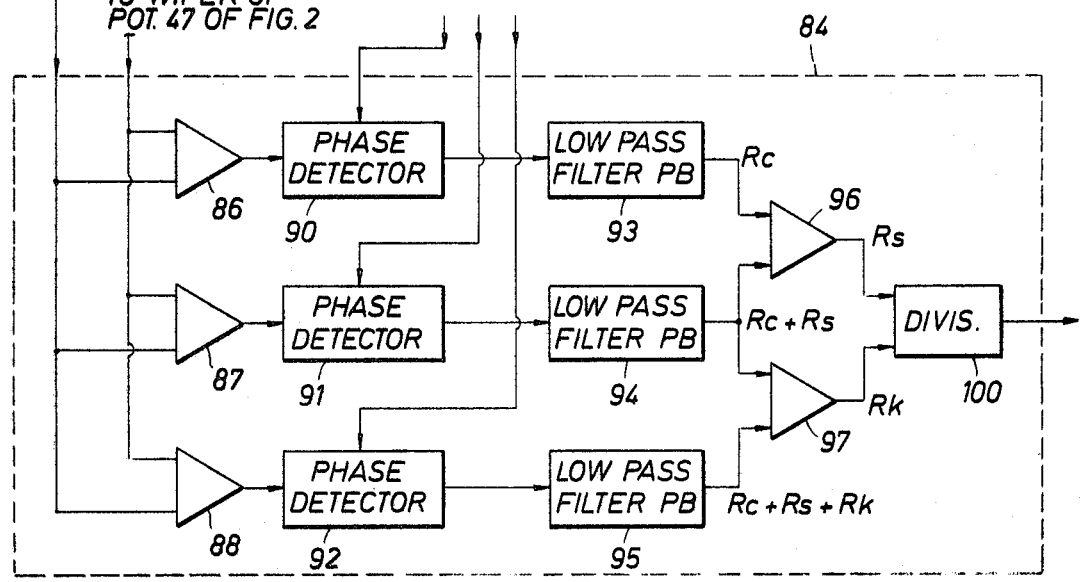
FIG. 6 is an alternative for the circuits on FIG. 1 to adapt them to the probe of FIG. 5.

The surface circuits are similar to those of FIG. 2, sub-assembly 49 being, however, replaced by sub-assembly 84 in FIG. 6. Point 46 and the moving contact of potentiometer 47 (FIG. 2), are connected to the inputs of three circuits mounted in parallel and each consisting of a differential amplifier 86, 87 and 88, a phase detector 90, 91 and 92 and a low pass filter 93, 94 and 95. The outputs of filters 93 and 94 are connected to a differential amplifier 96 and, the outputs of filters 94 and 95 to a differential amplifier 97. The output signals from amplifiers 96 and 97 are applied to a divider circuit 100, itself connected to amplifiers 57 and 62 (FIG. 2).

In operation, a signal is delivered into conductor 17b that is similar to signal 70 or 73 (FIG. 3), but consisting of three levels, the first $k_2i$ being higher than $i_1$, the second $k_1i$ ranging between $i_0$ and $i_1$ and the third $i$ less than $i_0$. For the third level $i$, the two relays 33b and 83 are open generating a signal that is a function of the sum of the resistances in conductor 17b ($R_c$) of the temperature sensitive component 37b ($R_s$) and the calibration resistance 82 ($R_k$). For the second level $k_1i$, relay 83 closes generating a signal that is a function of $R_c+R_s$. For current $k_2i$, the two relays are closed and the signal obtained is a function of $R_c$ only. Amplifiers 86, 87 and 88 have gains that are respectively equal to $G/k_2$, $G/k_1$ and $G$ so as to obtain comparable signals. Differential amplifiers 96 and 97 generate signals that are respectively a function of $R_c+R_s-R_c=R_s$ and $$R_c+R_s+R_k-(R_c+R_s)=R_k$$

Divider circuit 100 makes an approximate correction as explained with reference to FIG. 1.

The invention is, of course, not limited to the practical methods of application described in the foregoing but can include numerous alternatives while remaining within the scope of the following claims.

What is claimed is:

1. A method of making temperature measurements in a well bore comprising the steps of:
   placing a temperature sensitive resistive element and a calibration resistive element in the well bore by means of a single conductor cable;
   supplying a constant current on the cable conductor to said temperature sensitive resistive element and measuring the voltage required to supply the constant current;
   removing the temperature sensitive resistive element and the calibration resistive element from the circuit including said conductor by short circuiting said elements;
   supplying a constant current to said conductor and measuring the voltage required to supply the constant current;
   supplying a constant current to the circuit including said conductor and said calibration resistive element and measuring the voltage required to supply the constant current; and
   combining the three voltage measurements to eliminate the resistance of said conductor and to correct for any error due to faulty insulation of said conductor thereby obtaining the resistance of said temperature sensitive resistive element.

2. The method of claim 1 and further including the steps of:
   measuring the flow rate of fluids in the well bore; and
   measuring the location in the well bore of the casing joints therein.

3. The method of claim 2 wherein all of the steps are performed repetitively while moving said temperature sensitive element vertically through the well bore and the resistance of said temperature sensitive element, the flow rate of well fluids and the location of casing joints therein are all recorded as a function of borehole depth.

4. Apparatus for performing temperature measurements in a well bore comprising:
   a temperature sensitive resistive component adapted to be suspended in a well bore by a single conductor cable;
   means for supplying a cyclic square wave current to the circuit comprising said temperature sensitive resistive element;
   means for short circuiting said temperature sensitive element to remove it from the circuit, said means including a relay having a control coil connected in series relationship with said temperature sensitive element, said relay being capable of being opened and closed by said cyclic square wave current;
   means for detecting the voltages on said cable conductor with said temperature sensitive resistive element both in and out of the circuit as current is supplied to the circuit; and
   means responsive to the detected voltages with said temperature sensitive element in and out of the circuit for generating a signal representative of the resistance of said temperature sensitive element independently of the resistance of said cable.

5. The apparatus of claim 4 and further including:
   means for moving said temperature sensitive resistive element vertically through the well bore while repetitively detecting the voltages with said temperature sensitive resistive element in and out of the circuit; and
   means for recording as a function of borehole depth said signal representative of the resistance of said temperature sensitive resistive element.

6. The apparatus of claim 4 wherein said means for generating a signal representative of the resistance of said temperature sensitive element includes two measuring circuits respectively adapted for detecting the voltages when said relay is open and closed and a differential circuit responsive to the outputs of said measuring circuits for generating a signal representative of the resistance of said temperature sensitive component independently of the resistance in said cable.

7. The apparatus of claim 6 wherein said two measuring circuits include input amplifiers in which the gains are in the same ratio as the magnitude of said square wave current.

8. The apparatus of claim 7 wherein said temperature sensitive resistive element comprises a metal wire whose resistance varies linearly as a function of temperature.

9. Apparatus for performing tempearture measurements in a well bore comprising:
   a temperature sensitive resistive component adapted to be suspended in a well bore by a single conductor cable;
   a calibration resistive element included in the circuit comprising said temperature sensitive element and said conductor cable;
   means for supply a constant current to the circuit comprising said calibration resistive element, said temperature sensitive element and said cable conductor;
   means for selectively removing either said temperature sensitive element or said calibration resistive element from said circuit by short circuiting said elements;
   means for detecting the voltages on said cable conductor with either or both said temperature sensitive element and said calibration resistive element in or out of said circuit; and
   means responsive to the detected voltages with either or both said temperature sensitive element and said calibration resistive element in or out of said circuit for generating a signal representative of the resistance of said temperature sensitive element independently of the resistance of said cable conductor or any leakage resistance of said cable conductor.

10. The apparatus of claim 9 and further including:
    means for moving said elements vertically through the well bore while respectively detecting said voltages with either or both said temperature sensitive element and said calibration resistive element in or out of said circuit; and
    means for recording as a function of borehole depth said signal representative of the resistance of said temperature sensitive element.

11. The apparatus of claim 9 wherein said means for selectively removing either said temperature sensitive element or said calibration resistive element from said circuit includes plural relays having control coils connected in series with said elements, each of said coils being responsive to different magnitudes of current level for activating their respective relay.

12. The apparatus of claim 11 wherein said means for supplying a constant current includes a transmission circuit capable of generating a cyclic square wave current having at least three different magnitude levels so as to selectively control the closing of said relays.

13. The apparatus of claim 12 and further including two additional sensors, one for detecting casing joints and one for detecting the rate of fluid flow in the borehole, and two additional control relays each of said relays being capable of placing one of the additional sensors into the circuit according to the level of said square wave current.

14. Apparatus adapted for measuring well bore temperatures and comprising:
    a body adapted for suspension in a well bore from an electrical cable;
    first resistance means on said body and having a constant electrical resistance over a selected range of ambient temperatures;
    second resistance means on said body and having a proportionally-varying electrical resistance over said selected range of ambient temperatures;
    selectively-operable resistance-shunting means on said body and including switching means electrically connected in parallel across said first and second resistance means respectively and adapted for movement between an open first switching position and closed second and third switching positions for successively shorting first one of said resistance means and then shorting both of said resistance means, and current-responsive solenoid means operatively coupled to said switching means and adapted for successively moving said switching means from said first switching position to said second and said third switching positions upon passage of electrical currents of progressively-increasing magnitudes through said solenoid means; and
    conductor means on said body electrically connecting said solenoid means in series with said first and second resistance means and adapted for connection to a selected conductor in an electrical cable suspending said body in a well bore for passing electrical current from the surface through said solenoid means and said resistance means as selectively determined by said switching positions of said switching means.

15. The apparatus of claim 14 further comprising condition-sensing means on said body adapted for producing an electrical signal indicative of a selected well bore condition; and
    selectively-operable means on said body adapted for selectively connecting said condition-sensing means to said conductor means and including normally-open switching means electrically interconnecting said condition-sensing means to said conductor means, and additional current-responsive solenoid means operatively coupled to said normally-open switching means and adapted for closing said normally-open switching means upon passage of electrical current through said additional solenoid means of a magnitude greater than said progressively-increasing currents employed for operating said current-responsive solenoid means of said resistance-shunting means.

16. Well bore apparatus adapted for suspension from an electrical cable having a single electrical conductor and comprising:

a housing adapted for passage through a well bore;

calibrated resistance means in said housing and having a constant electrical resistance over a selected range of well bore temperatures;

variable resistance means in said housing and having a proportionally-varying electrical resistance over said selected range of well bore temperatures;

first resistance-shunting means in said housing and including first switching means electrically connected in parallel across one of said resistance means and selectively movable between a normally-open position and a closed position for shorting said one resistance means, and first current-responsive solenoid means operatively coupled to said first switching means and adapted for selectively moving said first switching means to its said closed position upon passage through said first solenoid means of an electrical current of a first selected value;

second resistance-shunting means in said housing and including second switching means electrically connected in parallel across the other of said resistance means and selectively movable between a normally-open position and a closed position for shorting said other resistance means, and second current-responsive solenoid means operatively coupled to said second switching means and adapted for selectively moving said second switching means to its said closed position upon passage through said second solenoid means of an electrical current of a second selected value greater than said first selected value; and conductor means in said housing adapted for connection to a single cable conductor and electrically interconnecting said resistance means and said solenoid means in series with one another for passage of electrical current therethrough.

17. The well bore apparatus of claim 16 further including:

detecting means in said housing adapted for providing a characteristic electrical signal in response to movement of said housing past a casing joint in a well bore; and selectively-operable means in said housing adapted for selectively connecting said detecting means to said conductor means and including third switching means electrically connected between said conductor means and said detecting means and selectively movable between a normally-open position and a closed position, and third current-responsive solenoid means operatively coupled to said third switching means and adapted for selectively moving said third switching means to its said closed position upon passage through said third solenoid means of an electrical current of a third selected value greater than said first and said second values.

References Cited

UNITED STATES PATENTS

| | | | |
|---|---|---|---|
| 3,305,825 | 2/1967 | Godbey | 73—151 X |
| 3,397,573 | 8/1968 | Carter | 73—170 O |
| 2,508,478 | 5/1950 | Vehling | 73—362 |
| 2,517,455 | 8/1950 | Waters | 73—154 X |
| 2,676,489 | 4/1954 | Basham | 73—362 X |
| 3,068,447 | 12/1962 | Godbey | 73—154 X |
| 3,483,749 | 12/1969 | Francis | 73—344 |

CHARLES A. RUEHL, Primary Examiner

U.S. Cl. X.R.

73—344